Figure 1:
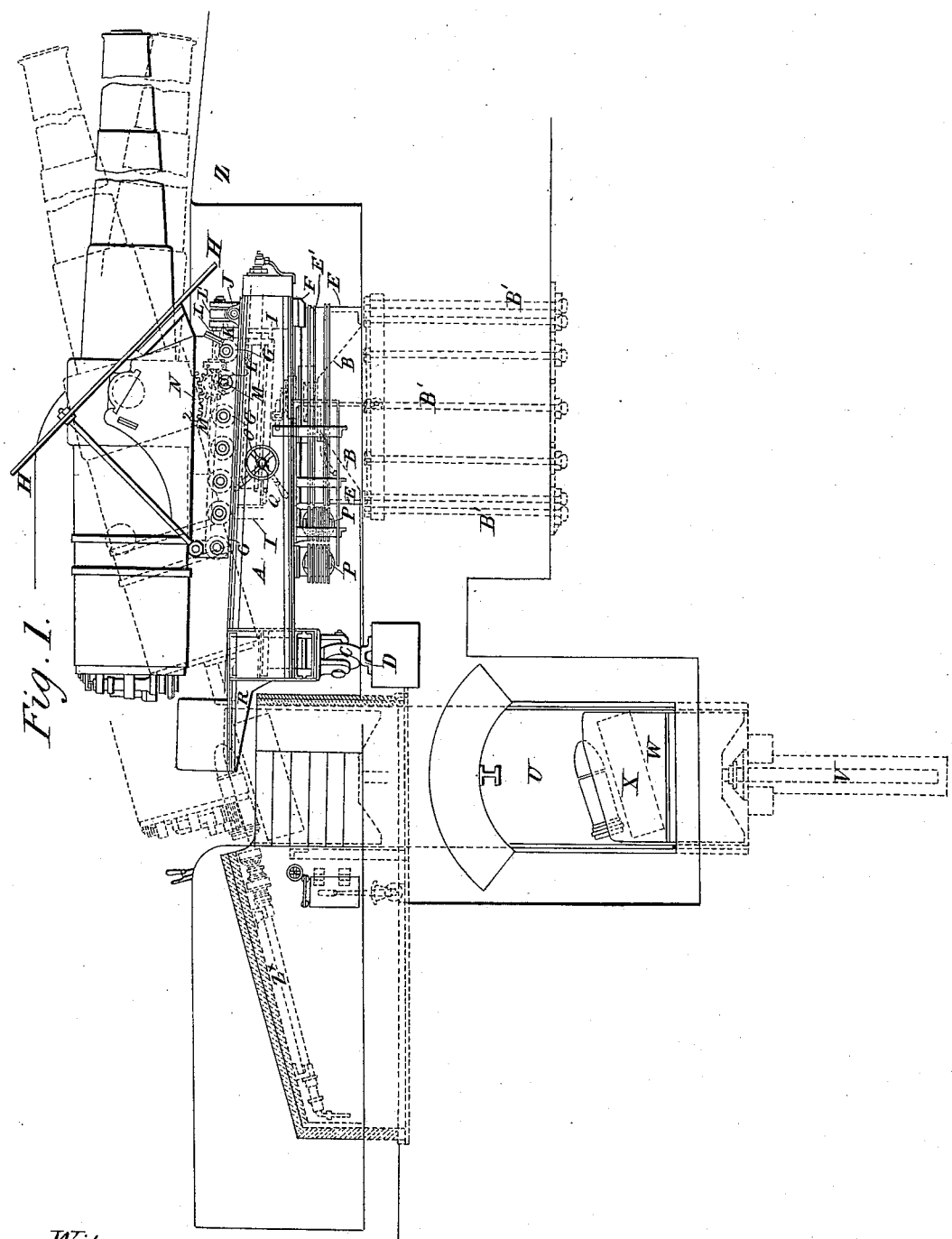

(No Model.) 10 Sheets—Sheet 1.

R. T. BRANKSTON.
HYDRAULIC LOADING AND OPERATING MECHANISM FOR ORDNANCE.

No. 377,924. Patented Feb. 14, 1888.

Witnesses
Inventor
R. T. Brankston (No Model.) 10 Sheets—Sheet 2.

R. T. BRANKSTON.

HYDRAULIC LOADING AND OPERATING MECHANISM FOR ORDNANCE.

No. 377,924. Patented Feb. 14, 1888.

(No Model.) 10 Sheets—Sheet 3.
R. T. BRANKSTON.
HYDRAULIC LOADING AND OPERATING MECHANISM FOR ORDNANCE.
No. 377,924. Patented Feb. 14, 1888.
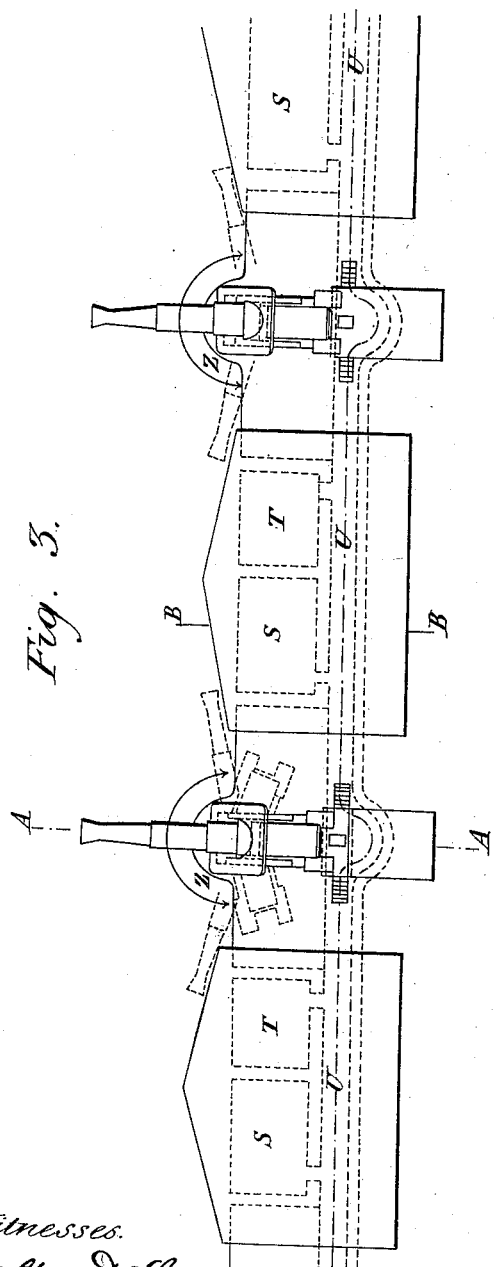
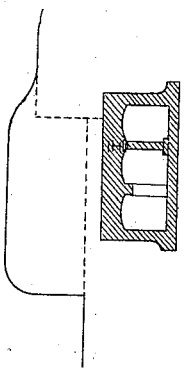
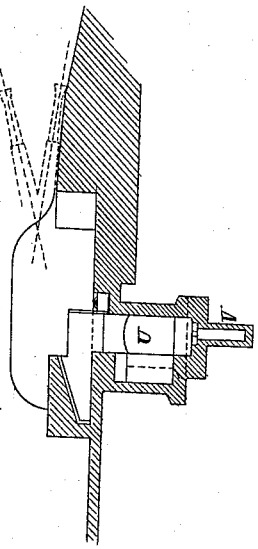

(No Model.) 10 Sheets—Sheet 4.
R. T. BRANKSTON.
HYDRAULIC LOADING AND OPERATING MECHANISM FOR ORDNANCE.
No. 377,924. Patented Feb. 14, 1888.

Witnesses
Inventor (No Model.)   10 Sheets—Sheet 5.

R. T. BRANKSTON.
HYDRAULIC LOADING AND OPERATING MECHANISM FOR ORDNANCE.

No. 377,924. Patented Feb. 14, 1888.

Witnesses
Inventor

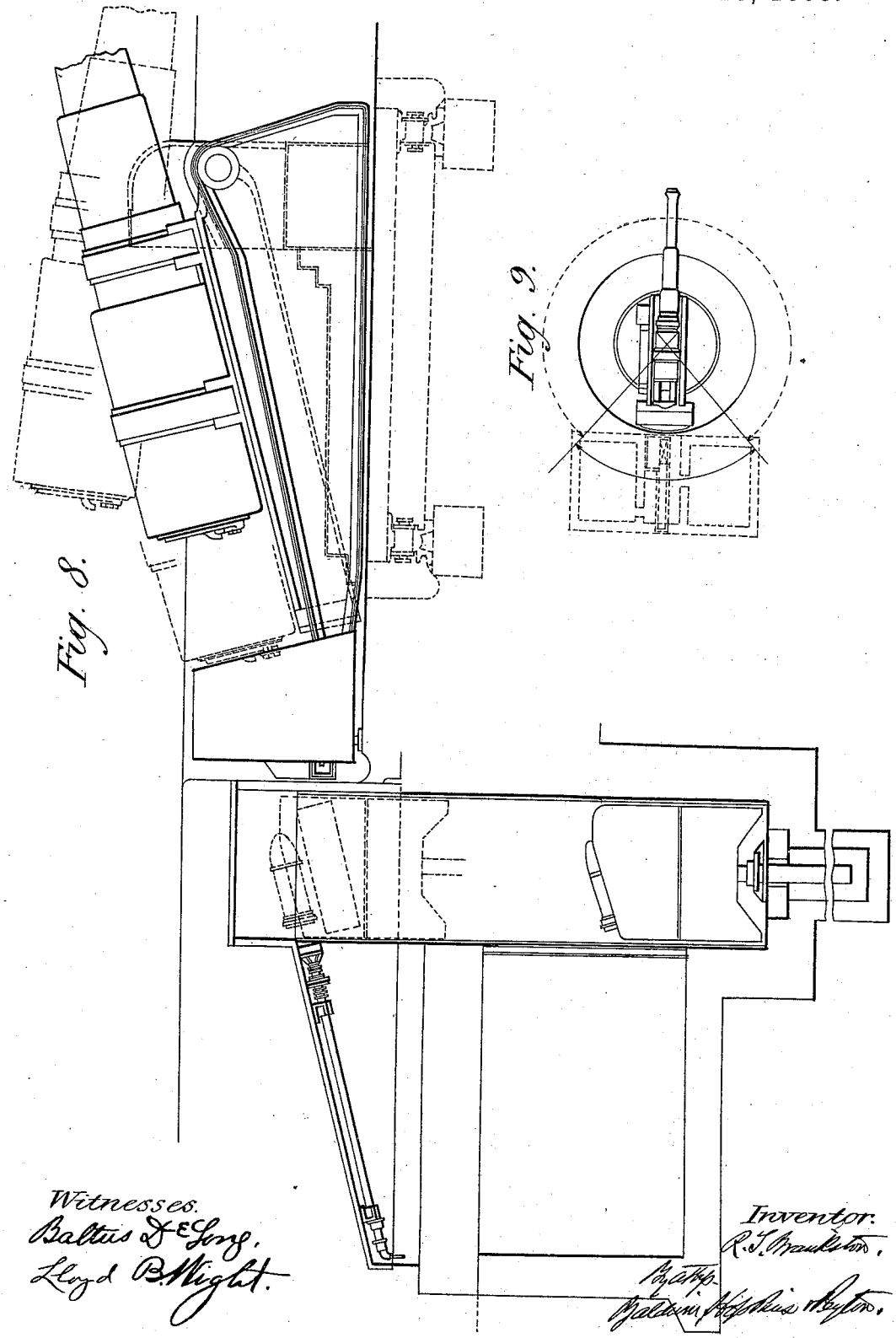

(No Model.) 10 Sheets—Sheet 7.
R. T. BRANKSTON.
HYDRAULIC LOADING AND OPERATING MECHANISM FOR ORDNANCE.
No. 377,924. Patented Feb. 14, 1888.
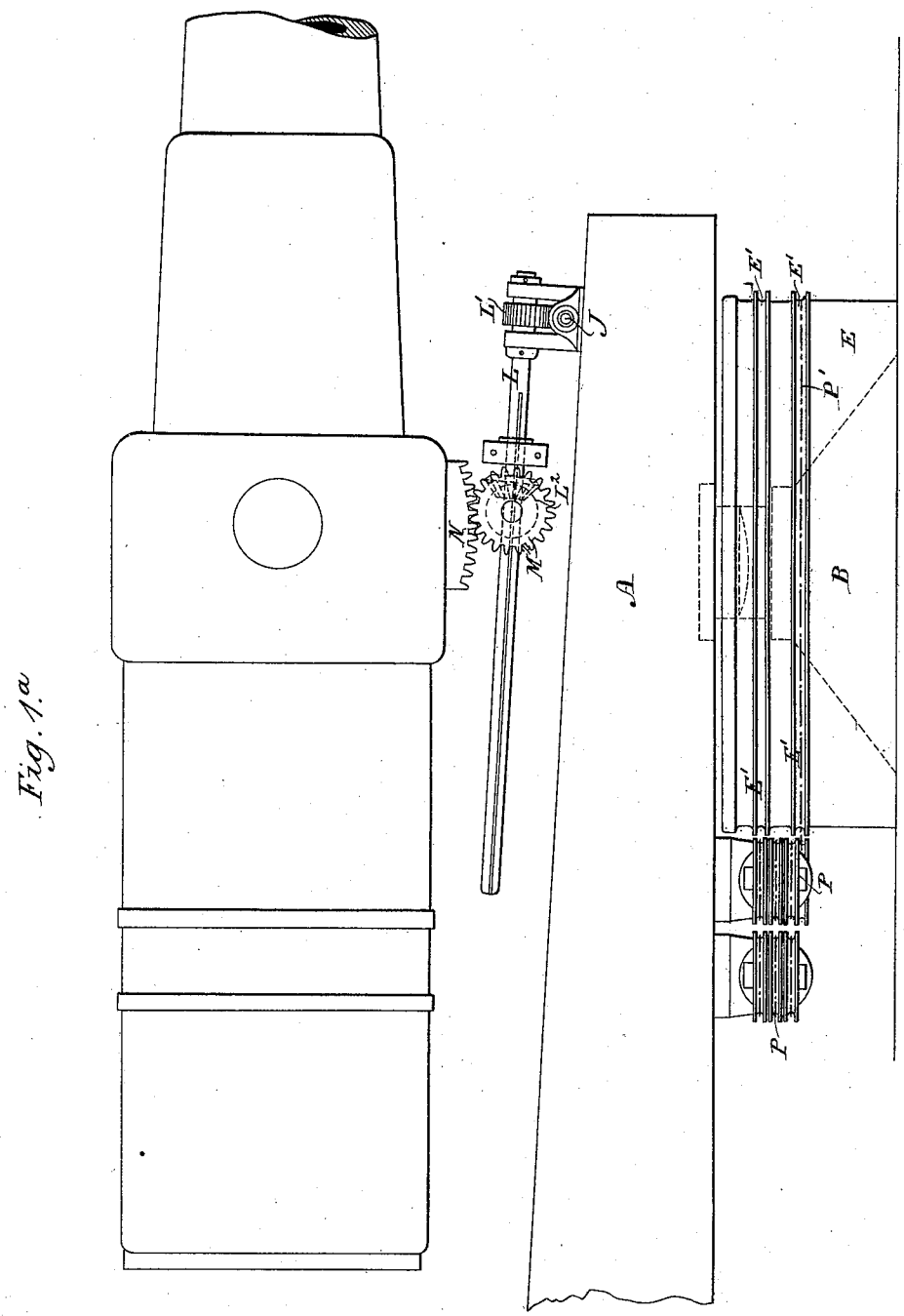

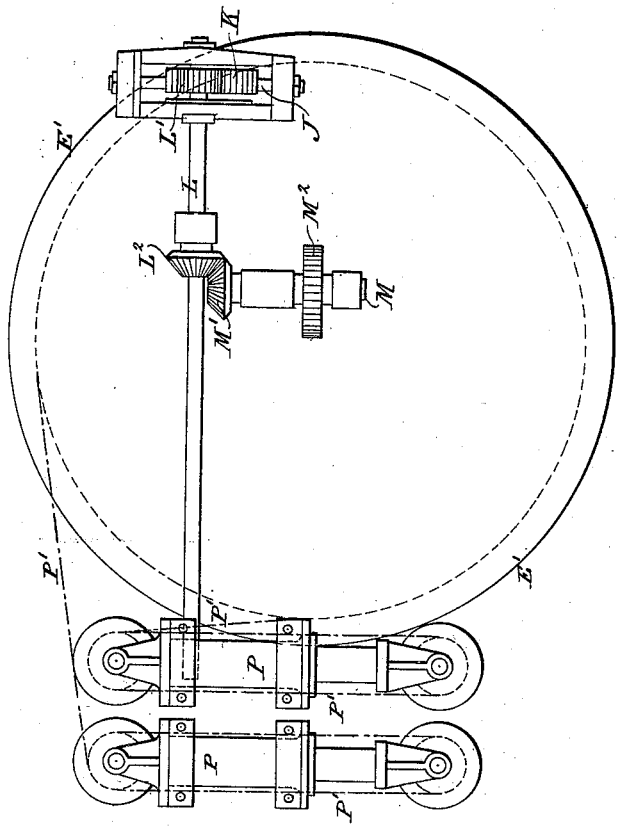

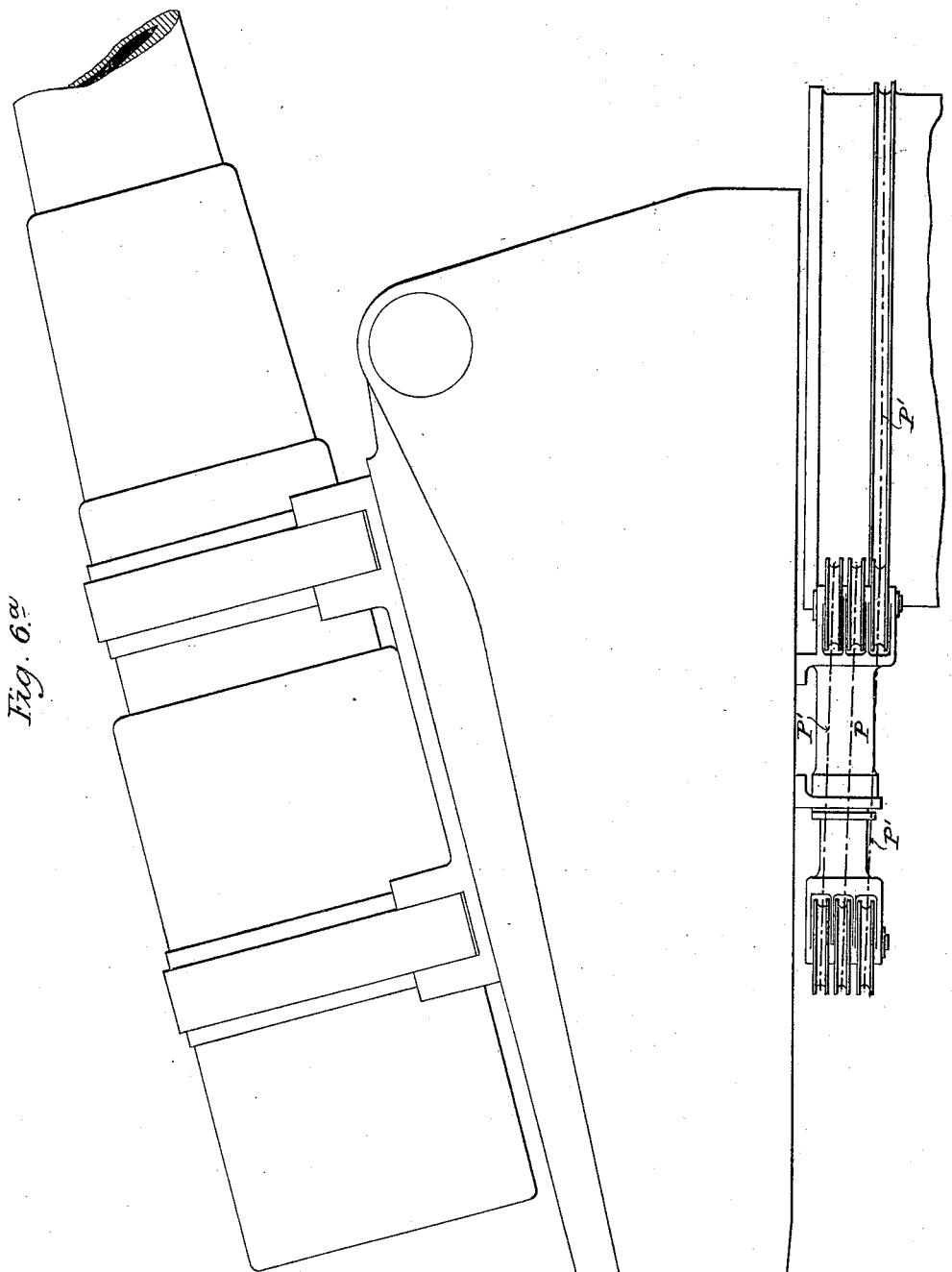

(No Model.) 10 Sheets—Sheet 10.
R. T. BRANKSTON.
HYDRAULIC LOADING AND OPERATING MECHANISM FOR ORDNANCE.
No. 377,924. Patented Feb. 14, 1888.
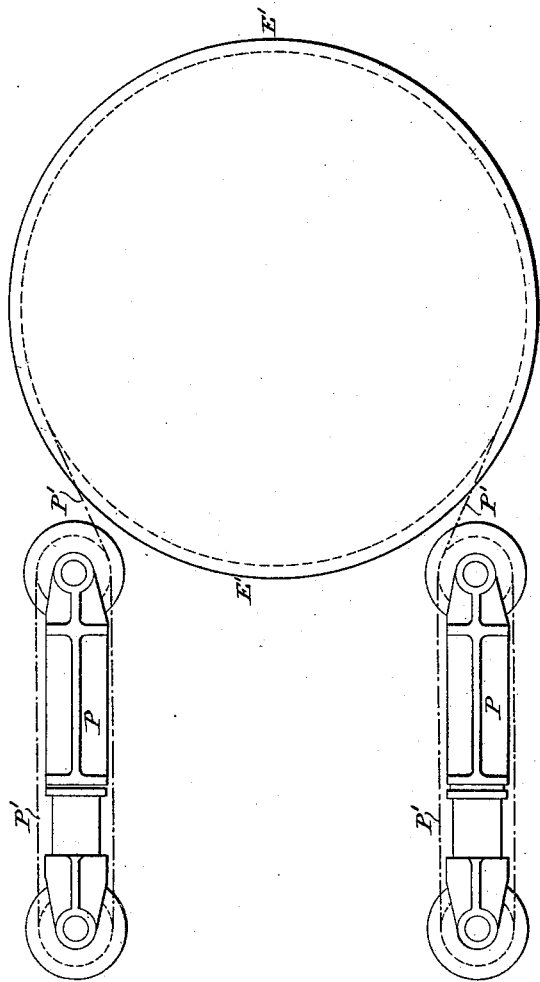
Fig. 7ª
Witnesses.
Inventor.

UNITED STATES PATENT OFFICE.

RALPH T. BRANKSTON, OF NEWCASTLE-UPON-TYNE, ENGLAND, ASSIGNOR TO W. G. ARMSTRONG, MITCHELL & CO., (LIMITED,) OF SAME PLACE.

HYDRAULIC LOADING AND OPERATING MECHANISM FOR ORDNANCE.

SPECIFICATION forming part of Letters Patent No. 377,924, dated February 14, 1888.

Application filed July 2, 1887. Serial No. 243,238. (No model.) Patented in Italy March 31, 1887, No. 21,481.

*To all whom it may concern:*

Be it known that I, RALPH THEW BRANKSTON, a subject of the Queen of Great Britain, residing at The Elswick Works, Newcastle-upon-Tyne, England, engineer, have invented certain new and useful Improvements in Mounting and Working Heavy Guns by Hydraulic Power, (for which I have received Letters Patent in Italy, dated March 31, 1887, No. 21,481,) of which the following is a specification.

This invention has for its object improvements in mounting and working heavy guns by hydraulic power. The arrangements are such as to minimize the number of men required and to protect, as much as possible, the men and machinery from the enemy's fire. The powder and projectiles are stowed in magazines and shell-rooms well underground at the sides of the gun. They are conveyed by runners along an underground passage to a hydraulic lift. They are raised vertically by the lift into a position immediately in rear of the breech of the gun when it is in a central loading position. The projectile is then forced into the gun by a hydraulic or other rammer, and then the powder-charge. The breech is opened and closed by men standing on a loading-platform, which automatically turns up into a vertical position out of the way when the men leave it. A pumping engine and accumulator is employed for supplying power to the gun-mountings for elevating and training the gun and for actuating the rammer. The gun is mounted on a carriage, which, on recoiling, runs back along a platform which is mounted on a vertical pivot which is nearly under the center of gravity of the gun and carriage when the gun is run out. The elevating-gear is composed of a toothed rack moved endwise to and fro by hydraulic power. The rack gears with and drives a pinion on an axis which is parallel with the longitudinal central line of the gun-slide. On this axis is a bevel-wheel which turns with the axis, but is free to slide along it. This gears with an arc of teeth beneath the gun. Consequently the elevating-gear does not interfere with the recoil of the gun. The training is done by hydraulic cylinders placed on the gun-mounting. The cylinders act upon chains which pass around and are attached to drums round the pivot-cylinder. When the gun is run out, the weight of the gun and carriage is approximately balanced on the pivot.

The guns are placed behind a parapet, Z, and the powder and projectiles are, as shown at Figure 3, stowed in magazines and shell-rooms S T well underground at the sides of the gun. They are conveyed by means of runners along an underground passage, U, to a hydraulic lift, V, which is situated just in rear of the breech of the gun when the gun has been turned into a central position for loading. When the cage W of the lift is in lowest position, the ammunition is placed onto it, the projectile being put into a trough on the top of the cage and the powder placed into a pocket, X, underneath the projectile. While the cage is down, the platform is brought to the loading position, the breech of the gun is opened, and the gun is placed at extreme elevation. The cage is then lifted by means of the direct-acting cylinder V until it comes against a stop, the projectile being then in line with the bore. The projectile is then rammed home by means of the hydraulic rammer $Z^\times$, after which the stop is withdrawn and the cage lifted higher against another stop, when the powder is in line with the bore. Then the powder in its turn is rammed into the gun by means of the hydraulic rammer. The gun may then be elevated and the breech closed.

Preferably the projectiles are lifted and placed on the runners in the shell-rooms by means of capstans worked by hydraulic power. The powder is lifted in the magazines in the same manner.

Figure 2:
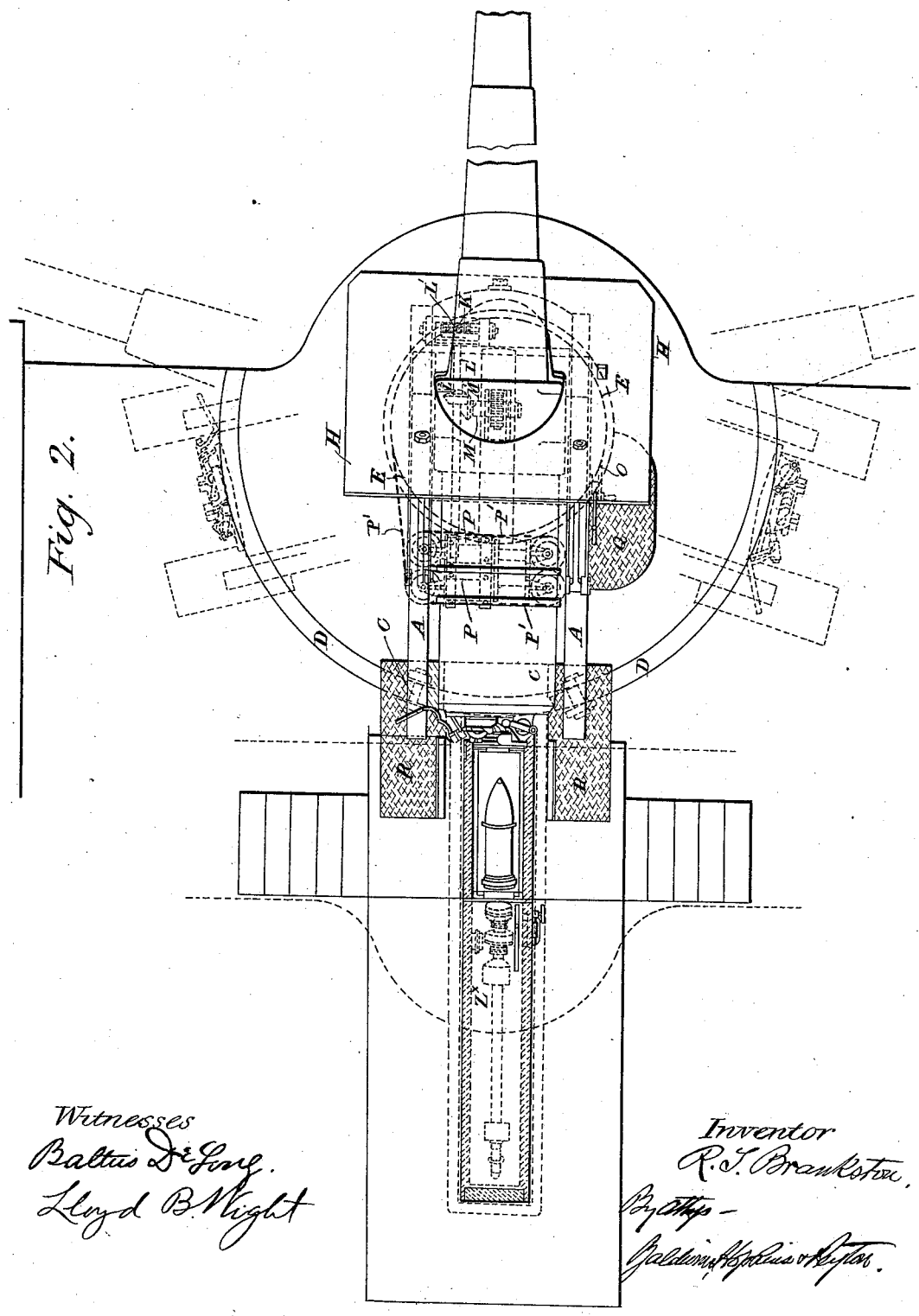
Figure 6:
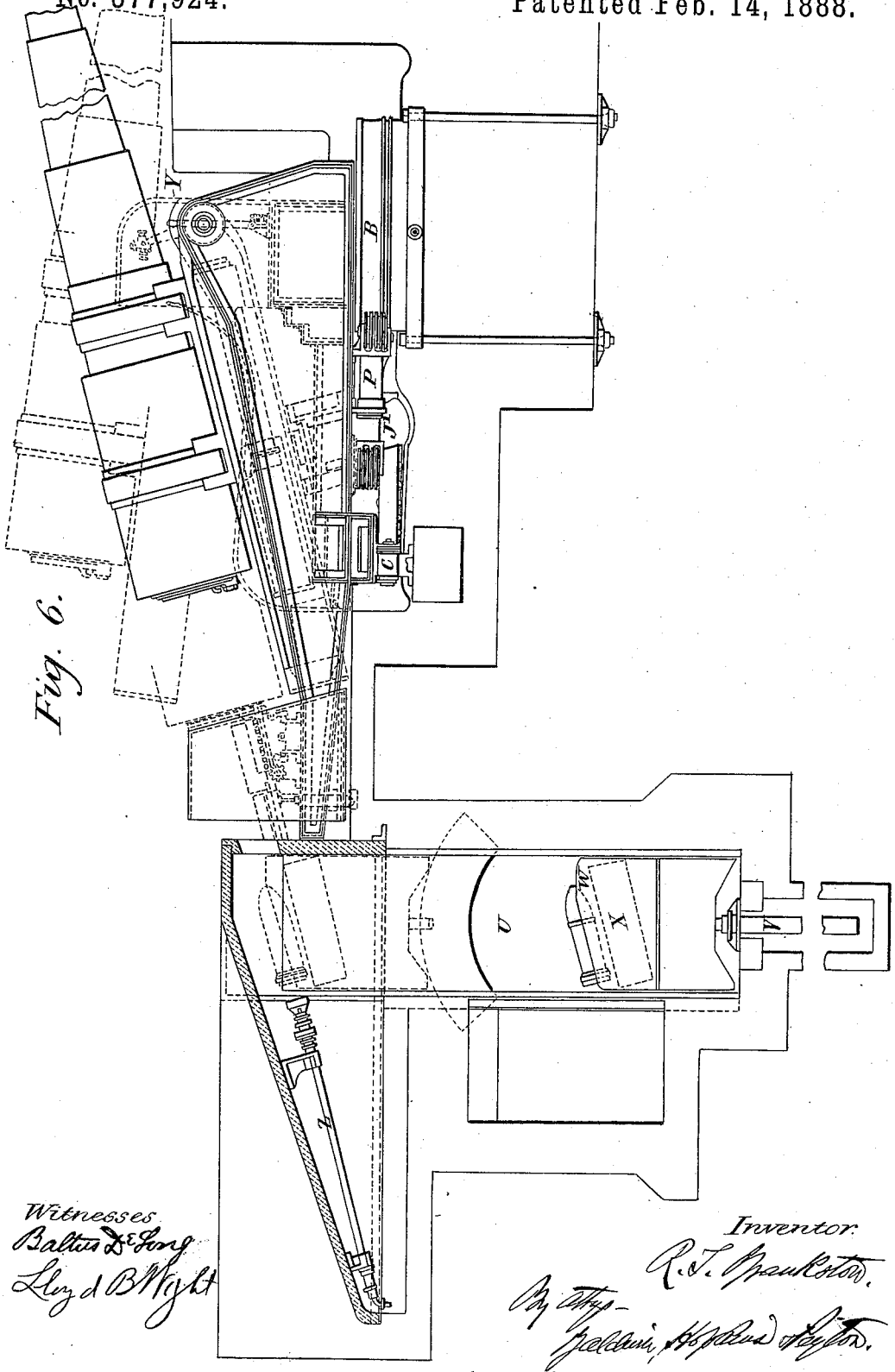

Figs. 1 and 2 of the drawings hereunto annexed show a side elevation and plan of an arrangement of automatic garrison-mounting. Fig. 1$^a$ is an elevation corresponding with a portion of Fig. 1, showing to a larger scale details of the parts which relate to the elevating and the training of the gun. Fig. 2$^a$ is a plan corresponding with a portion of Fig. 2, also enlarged and showing again the parts represented in Fig. 1$^a$. Fig. 3 is a plan, on a smaller scale, showing the arrangement of the magazine and shell-room and underground tunnel for conveyance of ammunition to the guns. Fig. 4 is a vertical section through the line A A, Fig. 3; and Fig. 5, a vertical section through the line B B, Fig. 3. Fig. 6 is a side elevation, and Fig. 7 a plan, of a gun-mounting similar in design to that above described, but with the gun placed upon a barbette-carriage, so that it always recoils in the line of fire. Fig. 6ª is an elevation corresponding with a portion of Fig. 6, enlarged, and showing details of the training-gear; and Fig. 7ª is a plan showing enlarged a like portion of Fig. 7. Fig. 8 is a side elevation, and Fig. 9 a plan view, on a smaller scale, of a gun-mounting constructed in the same manner, except that the platform is supported entirely on a ring of live rollers.

In the gun-mounting shown at Figs. 1 and 2 each gun is carried on a platform or slide, A, mounted on a pivot, B, at the front, which is placed nearly under the center of gravity of the gun and mounting, and at the rear it is carried on rollers C, which run on a racer, D. The pivot is a large casting well spread at the base and securely fixed to the foundation by means of long bolts B' and anchor-plates. Around the pivot B is fixed a cylinder, E, having a flange on the top, to which clips F on the slide take to prevent the mounting from lifting at the front. Underneath the platform, and nearly touching the top of the cylinder, are fitted bearing-pieces. These take a bearing on the top of the cylinder when the gun is fired. At other times the bearing-pieces are clear and the weight taken on the bearing-pieces on firing is only due to the deflection of the girders.

The gun is mounted on a carriage on permanent rollers G, the cheeks of the carriage being made of armor-plate, so that the part exposed above the parapet may not be subject to damage from machine-gun fire. Upon the carriage is carried a shield, H, for the protection of the gun detachment. To the carriage is fitted a recoil-press, I, having the piston-rod attached to the front end of the platform in well-known way. The recoil-press is so arranged, as heretofore, that the gun returns automatically into firing position immediately after firing. The recoil-press is also made available, as heretofore, for running the gun back for cleaning or other purposes, the accumulator pressure being then admitted through the piston-rod into the recoil-press, and by means of a working-valve on the platform the gun may be run in or out, as desired, in ways which are well understood.

The elevating-gear is arranged to be worked by hydraulic power by means of a hydraulic cylinder, J, moving to and fro along the piston and toothed gear. The hydraulic cylinder J and its piston are carried by the gun-platform at its front and extend transversely to the gun. The cylinder, by means of a rack, K, rotates a pinion, L', on a longitudinal axis, L. A beveled pinion, L², slides along this axis and turns with it. It gears with a similar pinion, M', on a transverse horizontal axis, M, on the carriage, and a tooth-wheel, M², on this transverse axis gears with an arc of teeth, N, beneath the gun. The valve for the elevating-cylinder is worked by the hand-wheel O by the man sighting.

The training is done by means of hydraulic cylinders P, placed under and carried by the platform. These cylinders act upon chains P', passing around pulleys on the cylinders and their rams and which pass around and are attached to drums E', which are concentric with the pivot-cylinder E. The valve for the training-gear is acted upon by a handle, Q, placed near the valve for the elevating-gear, so that the training and elevating are under the command of one man. Nearly the whole weight of the gun and mounting being taken on the end of the pivot-pin, very little power is required for training. It is arranged to open and close the breech by hand-power. The platform R, on which the men stand for opening and closing the breech, is made with that portion of it which is immediately in rear of the breech capable of turning up into a vertical position out of the way, so that it may not interfere with the loading of the gun. Steps are provided for access to this loading-platform.

Figure 7:
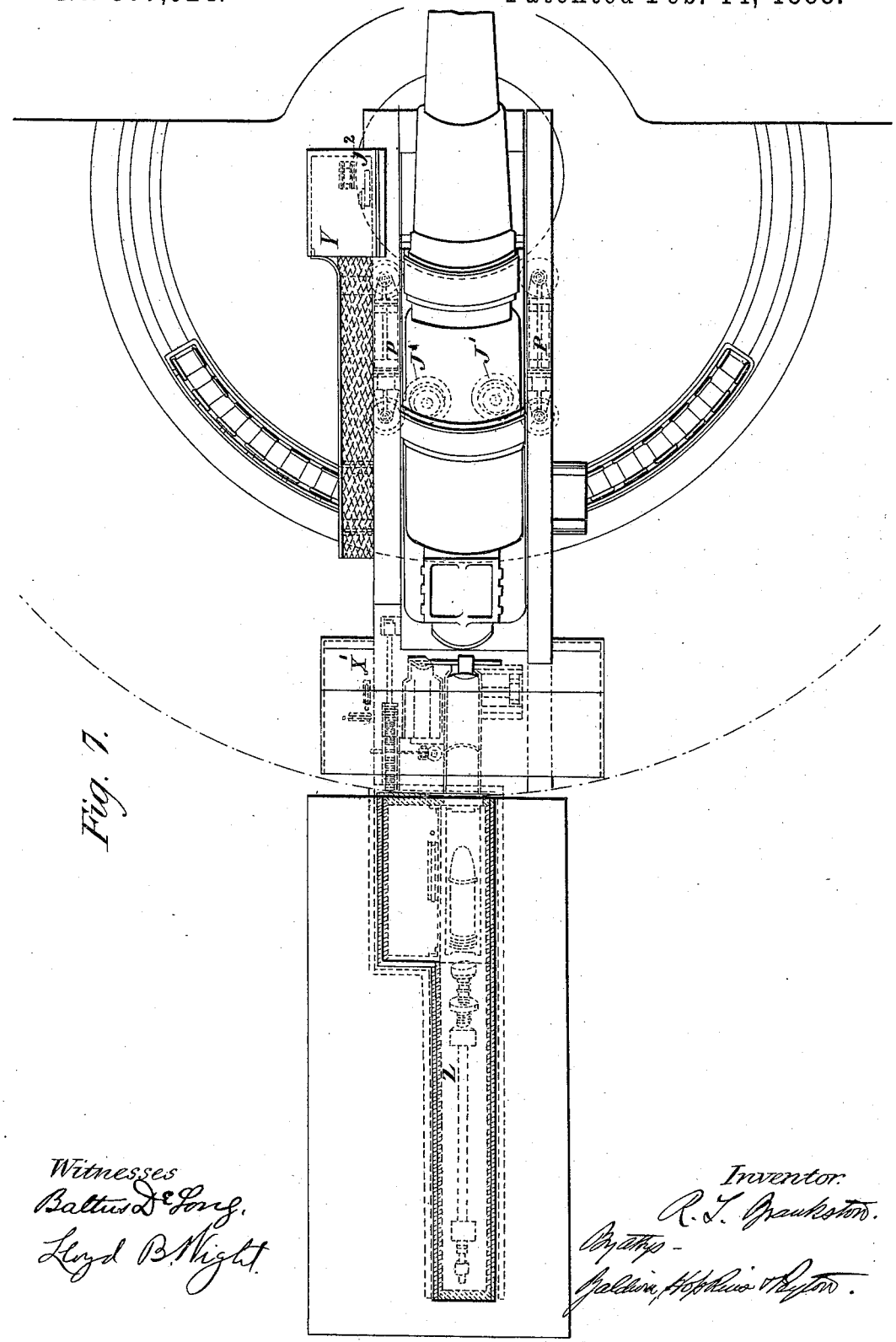

In the modification shown at Figs. 6 and 7 the weight of the front of the mounting is, as before, taken upon the pivot B and on live rollers C at the rear. The breech is opened by hydraulic power, as described in applications for United States Letters Patent of G. W. Rendel, No. 240,544, filed June 7, 1887, and C. H. Murray, No. 240,611, filed June 8, 1887. This hydraulic mechanism is controlled by handles at X'. Elevating-cylinders J' on the platform support the slide and raise it in rear to bring the gun to the elevation required, as in other well-known gun-mountings. The admission of the liquid under pressure to these cylinders or its escape from them is controlled by a handle at J². A splinter-proof sighting-station, Y, is placed on one side of the platform and the gun is sighted by means of a telescopic sight which is carried from the gun-slide. The man at this sight has control of the elevating and training gear. The training-gear and arrangement for serving the ammunition are the same as in Figs. 1, 2, and 3, and are marked with the same letters of reference.

In the modification shown at Figs. 8 and 9 the platform is supported entirely on a ring of live rollers, the front of the mounting being held down by means of clips to the roller-path. The recoil-strains are taken on the flanges of the rollers. All round fire may be obtained in this design.

Having now particularly described and ascertained the nature of my said invention and in what manner the same is to be performed, I declare that what I claim is—

1. The combination, substantially as set forth, of the carriage carrying the gun, the horizontally-turning platform supporting the carriage and along which it recoils, the vertical lift in rear of the gun when the platform is centrally placed, the ammunition-stores on either side of the gun and sunk beneath it, the tunnel between the ammunition-stores and the shaft in which the lift works, and the mechanical rammer which drives the charge forward from the cage of the lift into the gun.

2. The combination of the gun-carriage, the gun-platform, the hydraulic cylinder on the front of the gun-platform and extending transversely to the gun, the rack on this cylinder, the pinion in gear with this rack, the longitudinal axis on the gun-platform, and which at its front end carries this pinion, the pinion sliding on this axis, and the transverse axis and its gearing on the gun-carriage by which the sliding pinion is geared with the arc of teeth beneath the gun.

3. The combination of the pivoted horizontally-turning gun-platform, the two hydraulic cylinders beneath and carried by the gun-platform, the drum concentric with the pivot of the gun-platform, pulleys on said cylinders and their rams, and chains passing around said pulleys and around the drum, substantially as and for the purpose set forth.

R. T. BRANKSTON.

Witnesses:
   T. PURVIS,
   WM. JOHN GREY,
      *Notary Public.*